US005901939A

United States Patent [19]

Cabuz et al.

[11] Patent Number: 5,901,939

[45] Date of Patent: May 11, 1999

[54] BUCKLED ACTUATOR WITH ENHANCED RESTORING FORCE

[75] Inventors: Cleopatra Cabuz, Edina; Thomas R. Ohnstein, Roseville; William R. Herb, Minneapolis, all of Minn.

[73] Assignee: Honeywell Inc., Minneapolis, Minn.

[21] Appl. No.: 08/948,336

[22] Filed: Oct. 9, 1997

[51] Int. Cl.$^{6}$ .................... F16K 31/02

[52] U.S. Cl. .................... 251/129.02; 251/129.01; 251/901

[58] Field of Search .................... 251/129.01, 129.08, 251/129.02, 901, 331

[56] References Cited

U.S. PATENT DOCUMENTS

| | | | |
|---|---|---|---|
| 4,756,508 | 7/1988 | Giachino et al. | 251/331 |
| 4,821,999 | 4/1989 | Ohtaka | 251/129.02 |
| 5,065,978 | 11/1991 | Albarda et al. | 251/331 |
| 5,069,419 | 12/1991 | Jerman | 251/129.01 |
| 5,082,242 | 1/1992 | Bonne et al. . | |
| 5,176,358 | 1/1993 | Bonne et al. . | |
| 5,180,623 | 1/1993 | Ohnstein . | |
| 5,244,537 | 9/1993 | Ohnstein . | |
| 5,322,258 | 6/1994 | Bosch et al. | 251/129.01 |
| 5,323,999 | 6/1994 | Bonne et al. . | |
| 5,441,597 | 8/1995 | Bonne et al. . | |
| 5,452,878 | 9/1995 | Gravesen et al. | 251/129.01 |

FOREIGN PATENT DOCUMENTS 286258 10/1995 Japan .

OTHER PUBLICATIONS

Cabuz, "Tradeoffs in MEMS Materials", SPIE vol. 2881, p. 160 (Oct. 1996).

Shikida, Sato Characteristics of an Electrostatically–Driven Gas Valve under High Pressure Conditions.

Shikida,Sato,Harada, "Fabrication of an S–Shaped Microactuator," Journal of Microelectromechanical Systems, vol. 6 No. 1 (Mar. 1997).

Shikida,Sato,Tanaka,Kawamura,Fujisaki "Electrostatically-Actuated Gas Valve with large Condutance", 7$^{th}$ Intl. Conf. On Solid–State Sensors and Actuators, J. Microelectromech. Syst. vol. 3, No. 2 (Jun. 1994).

B.Halg, "On a Nonvolatile Memory Cell Based on Micro-Electro–Mechanics," Proceedings of MEMS CH2832–4/90/0000–0172 IEEE (1990).

Srinivasan et al, "Self–Assembled fluorocarbon Films for Enhanced Stiction Reduction".

*Primary Examiner*—Henry Bennett
*Assistant Examiner*—John Ball
*Attorney, Agent, or Firm*—John G. Shudy, Jr.

[57] ABSTRACT

An electrostatic actuator device including a stationary support and a buckled, moveable support mounted to enter into contact with the stationary support. At least three electrodes are employed. The first is mounted on the moveable support and a second electrode is on the stationary support. A third electrode is mounted on one of the supports such that the electrodes are positioned to form two pairs of electrodes for electrostatic attraction therebetween. The electrodes are powered by a voltage supply to provide electrostatic attraction between pairs of electrodes and move them into electrostatic contact. The buckled electrode has a shape configured to transmit a restoring force to its portion in contact with stationary support upon application of voltage to another pair of electrodes. The preferred voltage provides a two phase driving force including a voltage to the first pair of electrode for a period of time in a cycle of operation and a voltage to the second pair of electrodes for a period of time in the same cycle, preferably with an interim period of time with no voltage applied after each application of voltage. Various arrangements of three or more electrodes are disclosed, as is the use of the actuator in a microvalve having at least one valve opening. A three way microvalve is also shown, as are two forms of two dimensional valve arrays.

39 Claims, 6 Drawing Sheets

ARRAY OF VALVES WORKING SYNCHRONOUS

ADDRESSABLE ARRAY OF VALVES

BUCKLED ACTUATOR WITH ENHANCED RESTORING FORCE

FIELD OF THE INVENTION

The present invention relates to an electrostatic actuator. More particularly the invention relates to an improved actuator having an enhanced restoring force.

BACKGROUND OF THE INVENTION

Electrostatic actuators have become selected as the solution of choice for actuators that employ low power, operate at high speed, require low cost to produce, and are of small size. These devices present significant advantages: over thermal devices by requiring much less power; over electromagnetic devices using less power and having smaller size; or piezoelectric actuators that have a higher cost and have a much smaller amplitude of motion.

To date, however, there are no commercially available electrostatic actuators. Of particular concern are electrostatic actuation in the presence of dielectrically isolated electrodes, where specific problems are incurred.

In electrostatic actuators, the desired displacement is the result of the attractive electrostatic force generated by the interaction between a distribution of opposite sign charges placed on two bodies, one of which is moveable. For the purposes of this invention, these two bodies are known as actuator plates. The actuator plates are placed apart by a predetermined distance. The charge distribution is then generated by applying a potential difference between two conductive electrodes that are part of the actuator plates. The actuator will be in the ON state or mode when a potential difference is applied between the electrodes and will be in the OFF state when the electrodes are at the same potential.

One family of patents describes fluid control employing microminiature valves, sensors and other components using a main passage between one inlet and exit port and additionally a servo passage between inlet and outlet ports. The servo passage is controlled by a control flow tube such that tabs are moved electrostatically. U.S. Pat. No. 5,176,358 to Bonne et al teaches such a fluid regulating device, while divisional U.S. Pat. Nos. 5,323,999 and 5,441,597 relate to alternative embodiments.

The actual electrostatic device is only briefly described in the above patents, wherein at least one tab formed as part of a dielectric layer moves toward and away from an aperture upon activation of a means for varying the potential of at least one electrode associated therewith to generate an electrostatic force.

The above referenced patents identify another family of patents for further information on microvalves using electrostatic forces. The pending U.S. patent application referred to in those first discussed patents has matured into U.S. Pat. No. 5,082,242 to Bonne et al. This patent describes a microvalve that is an integral structure made on one piece of silicon such that the device is a flow through valve with inlet and outlet on opposite sides of the silicon wafer. The valves are closed by contact with a valve seat where surfaces must be matched in order to avoid degradation of valve performance. Two patents, U.S. Pat. Nos. 5,180,623 and 5,244,527 are divisional patents relating to the first patent. These patents generally describe operation of the electrostatic valve as being driven by various kinds of voltage sources. Specifically, the valve is said to operate as a two position valve with fully open and fully closed positions by applying a DC voltage between electrodes. Also, operation as a proportional control valve is disclosed as being effected by applying a voltage proportional to the voltage necessary to close the valve. Finally, These patents describe operation of the valve with a pulse width modulated voltage signal to modulate gas flow through the valve.

In some electrostatic actuators, the actuator plates have to come in intimate contact during the normal operation cycle. These actuators are sometimes referred to as touch-mode electrostatic actuators. In order to prevent electrical shorting during the touch phase of the operation cycle, the conductive electrodes are isolated from each other by dielectric layers. In order to get the maximum work from a specific device, large electric fields are usually developed between the two conductive electrodes. The non-linear character of the electrostatic attraction results in a snapping action, where the actuator plates move toward each other with accelerations as high as $10^8$ g and speeds that exceed $10^3$ m/sec. After the impact, the free surfaces of the actuator plates are pushed against each other by the large electrostatically generated pressure. This operation mode creates the possibility of very large mechanical impact and strong interaction forces being developed between the actuator plates. These forces can continue to act after removal of the potential difference between the actuator plates. In some cases, these forces are stronger than the restoring forces available for bringing the electrodes in their original position. In such a case, the two electrodes remain temporarily or permanently attached and the actuator stops functioning as intended and desired. This condition is sometimes referred to as 'stiction.' Electrostatic actuators in the prior art develop reduced restoring force that makes them prone to failure due to permanent stiction.

The main forces producing stiction in electrostatic actuators are surface interaction forces (solid bridging, Van der Waals forces, hydrogen bonds) and electrostatic forces produced by charges permanently or temporarily trapped into the dielectrics. To reduce the surface interaction forces, two approaches may be used. The first, reducing the contact area, requires more sophisticated structures and gives up some of the available electrostatic force. The second, reducing the surface energy of the layers in contact, has not yet been successfully demonstrated for devices based on that concept.

Another disadvantage of the electrostatic actuators of the prior art is that it is difficult to control their mechanical shape. It has become known that electrostatically driven actuators can supply high force when the separation gap between the moving parts is small. But, this constraint limits the maximum displacement attainable with electrostatically driven actuators to a few microns or less. To increase the maximum displacement without sacrificing the available force, a pre-stressed, upward bent cantilever structure with a rolling type motion was previously proposed. See the previously identified U.S. Pat. No. 5,176,358 to Bonne et al, and the related patents. This structure does in fact have advantages over earlier electrostatic actuators in that there is a small separation gap between the electrodes at the hinge, resulting in high electrostatic force and, via the parabolic shape, a higher maximum displacement. It is a simple structure, with a single wafer and surface micromachining, and requires low voltage (few tens of volts) and very low power. However, this structure also has some drawbacks. It is very difficult to control the stress gradient, i.e., of the maximum displacement and of the restoring force. Also, there is a very small restoring force, sometimes smaller than the interfacial adhesion forces, resulting in a permanent stiction of the actuator parts. This causes failure of the device.

It would be of great advantage to the art if these difficulties leading to failure could be reduced or avoided altogether.

It would be another great advance in the art if an improved driving method for electrostatic actuators could be provided for use with any actuator and configuration of the physical components thereof.

Yet another advantage in the art would be attained if the stress gradient could somehow be reduced, permitting better control of the device.

Still another advantage would be achieved if a device could be prepared that prevented permanent stiction, which is known to be the most important failure mechanism in touch mode actuators.

Other advantages will appear hereinafter.

SUMMARY OF THE INVENTION

It has now been discovered that the above and other objects of the present invention may be accomplished in the following manner. Specifically, the present invention provides an improved, buckled structure that removes the disadvantages of the prior art without giving up the advantages that have been achieved.

The actuator of this invention is a multi-phase buckled actuator that keeps the presently known simple structure, large electrostatic force and large displacement, while adding the important advantage of a high restoring force and much easier control of shape, reducing the devastation caused by stiction in the prior art. The actuator may be used with microvalves to improve their efficiency.

The actuator of this invention comprises a bridge type structure supported on both sides that has embedded electrodes. The electrodes on the bridge are isolated from the electrodes on the support to prevent electrical shorting in the touch mode operation. This is accomplished by adding an insulation layer over either the electrode in the bridge or on the support, or both.

The buckled electrode has a shape configured to transmit a restoring force to its portion in contact with stationary support upon application of voltage to a pair of electrodes not already engaged.

The preferred voltage provides a multi-phase driving force including a voltage to the first pair of electrodes for a period of time in a cycle of operation and a voltage to the second pair of electrodes for a period of time in the same cycle, preferably with an interim period of time with no voltage applied after each application of voltage.

A plurality of such actuators can be connected in parallel such as to form two dimensional arrays of actuators. The actuators in the array could be addressed all at the same time or addressed individually, depending on the intended use of the array.

BRIEF DESCRIPTION OF THE DRAWINGS

For a more complete understanding of the invention, reference is hereby made to the drawings, in which.

DETAILED DESCRIPTION OF THE PREFERRED EMBODIMENT

The present invention is defined by the use of a buckled structure that removes the drawbacks of the prior art design without giving up the newly found advantages. The electrostatic actuator of the present invention employs a buckled bridge structure. As in the prior art, there is a small separation gap at the supports, resulting in high electrostatic force. There is high maximum displacement with center deflection. It is a simple structure, formed on a single wafer by surface micromachining. Of course, it has a low driving voltage and very low power.

Because of its unique shape, the buckled bridge structure has a maximum displacement that is controlled by an average compressive stress instead of a stress gradient. The average stress is easier to control than the gradient. Moreover, a high restoring force is generated by the structure, by using a three (or more) electrode structure. This feature prevents permanent stiction, which is the most important failure mechanism in touch mode actuators and which has not been done before in electrostatic actuators. The actuators thus make extremely reliable and effective driving forces for microvalves and other devices where reliability and avoidance of stiction is important.

Figure 1A:
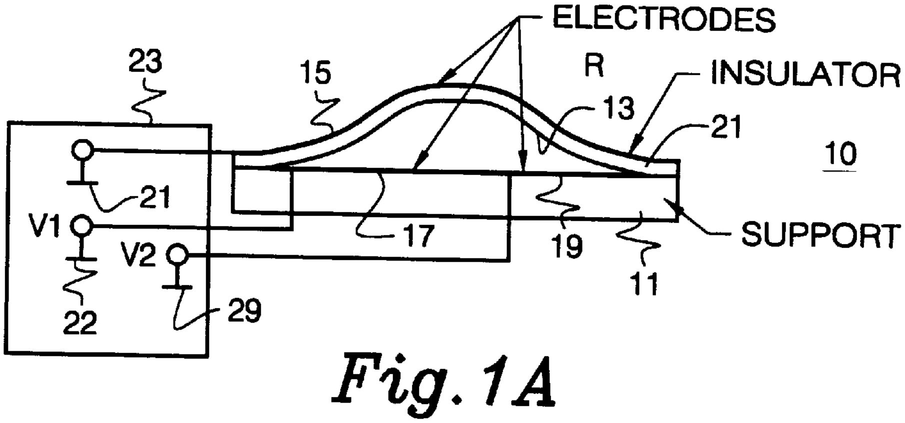
FIGS. 1A, 1B and 1C are schematic views of an embodiment of the present invention, showing the actuator in three stages of operation.

As shown in FIG. 1A, the actuator 10, generally, includes a stationary support 11 to which is fastened a buckled support 13. Buckled support 13 is supported at both ends on to stationary support 11, and is longer than the distance between supports. A preferred method of forming this buckled support 13 is by sacrificial layer etch, a commonly known semiconductor processing technique. When released, the bridge will form a bubble.

In the basic embodiment of this invention, a first electrode 15 is formed on buckled support 13 and a second and third electrodes 17 and 19 are formed on the stationary support. Non conducting insulation 21 is placed on the first electrode 15, or on the two electrodes 17 and 19 on support 11, or on both to insure no electrical conductivity. The structure must have at least three electrodes, but other embodiments shown below will incorporate at least one additional electrode.

Figure 1B:
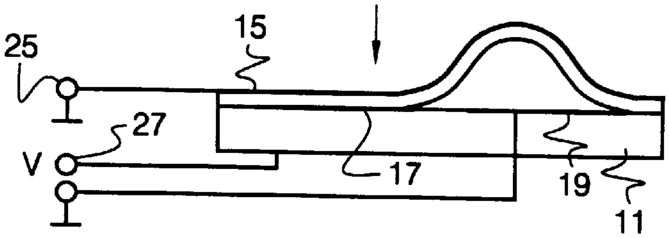
Figure 1C:
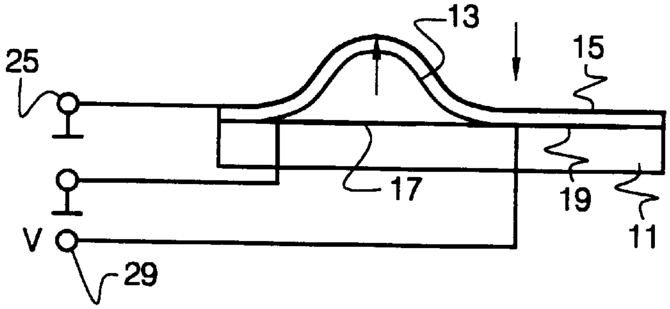

The actuator 10 in FIGS. 1A, 1B and 1C has a voltage supply means 23, which in this embodiments comprises a voltage source 25 connected to first electrode 15, a second voltage source 27 connected to second electrode 17 and a third voltage source 29 connected to third electrode 19. In the idle state shown in FIG. 1A, the voltage at source 27 equals voltage source 29, and both are at zero volts. When an operating voltage 27 for electrode 17 is applied, as in FIG. 1B, the left side of bridge support 13 is pulled down so that electrodes 15 and 17 are in electrostatic (but electrically insulated) contact.

In prior art devices, stiction would sooner or later cause the two electrodes 15 and 17 to stick, preventing return upon release of the voltage at 27. In the present invention, however, application of voltage at voltage source 29 pulls down first electrode 15 toward third electrode 19. Translation of the bubble support 13 will actively strip first electrode 15 from second electrode 17 from the substrate, providing a restoring force against the stiction.

Figure 2:
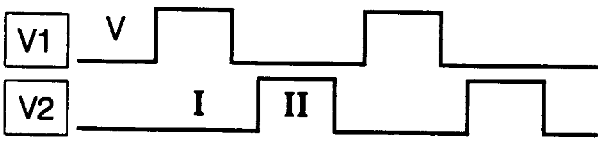
FIG. 2 is an illustration of the driving voltage for the device of FIG. 1.

FIG. 2 illustrates suitable driving voltages for the device of FIGS. 1A, 1B and 1C, where sources 27 and 29 are potentials against zero voltage 25 to create the driving electrostatic force.

Figure 3:
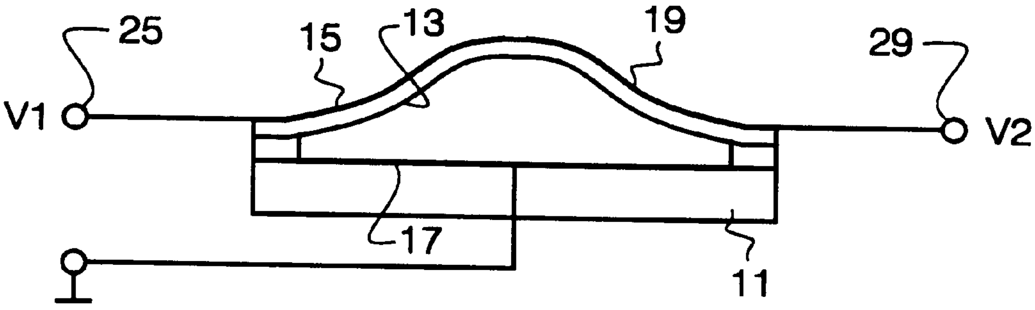
FIG. 3 is a schematic view of an alternative embodiment of a device similar to that shown in FIG. 1, also illustrating two-phase driving.

FIG. 3 illustrates an alternative embodiment using the same principles of this invention, where first electrode 15 is paired with third electrode 19 on buckled support 13 while second electrode 17 covers more of the surface of stationary support 11. Again, however, sequential application of two phase driving voltages via voltage sources 25 and 29 will cause the same alternating attraction between electrode pairs and, because of the buckled support construction, will have the same stripping force between electrodes no longer subjected to electrostatic force as that force is applied to the second pair of electrodes.

Figure 4:
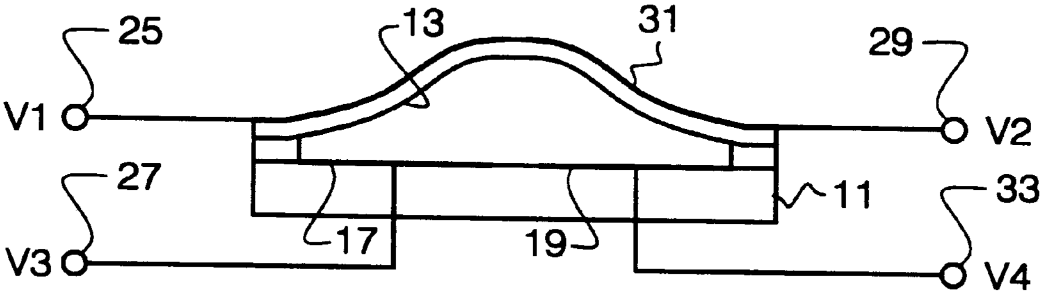
FIGS. 4 and 5 are schematic views of alternative embodiments in which four electrodes are employed, each in a different configuration.
Figure 5:
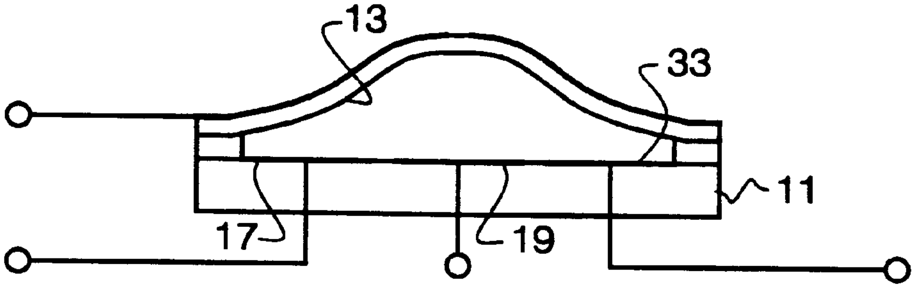

FIGS. 4 and 5 illustrate two additional embodiments of the present invention, in which a fourth electrode 31 is employed. In FIG. 4, the fourth electrode 31 is on the buckled, moveable support 13, so that electrodes 15 and 17 form one pair and electrodes 19 and 31 form a second pair. This embodiment is essentially a combination of those shown in FIGS. 1 and 3, with both stationary support 11 and buckled support 13 having two electrodes. In FIG. 5, buckled support 13 has first electrode 15, as in FIG. 1, and stationary support 11 has second electrode 17, third electrode 19 and fourth electrode 3 1, as shown. Both FIGS. 4 and 5 are driven by multiphase driving, via a voltage source as required. FIG. 4 includes four voltage source connections, 25, 27, 29 and 33, respectively, while FIG. 5 includes a different multiphase driving version, not numbered.

Figure 6A:
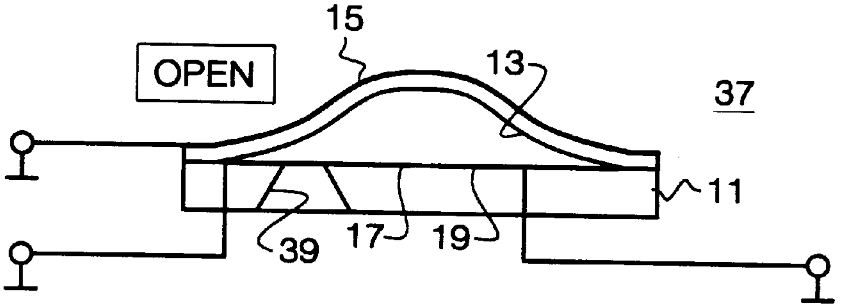
FIGS 6A, 6B, 7A and 7B illustrate two normally open microvalve embodiments using the actuator of this invention, showing both the open and closed states of each.
Figure 6B:
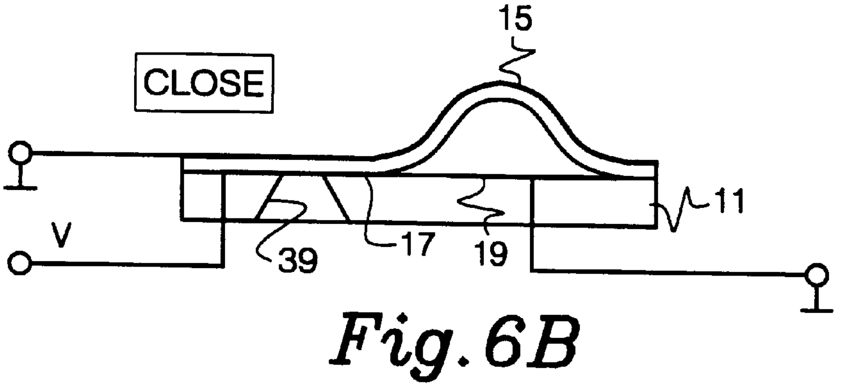

As was noted above, the present invention is admirable suited for use in microvalve systems due to the ability of the electrostatic actuator described herein to eliminate stiction. Shown in FIGS. 6A and 6B are the open and closed versions respectively of an electrostatically driven microvalve 37, generally, which defines a valve chamber and includes a valve opening 39 in stationary substrate 11. Second electrode 17 is formed to permit passage of fluids through opening 39, as in FIG. 6A; when the electrostatic forces bring first electrode 15 on to second electrode 17, the buckled moveable support 13 closes valve opening 39, as shown in FIG. 63. In this embodiment, electrostatic forces bring the electrodes together to close the valve opening.

Figure 7A:
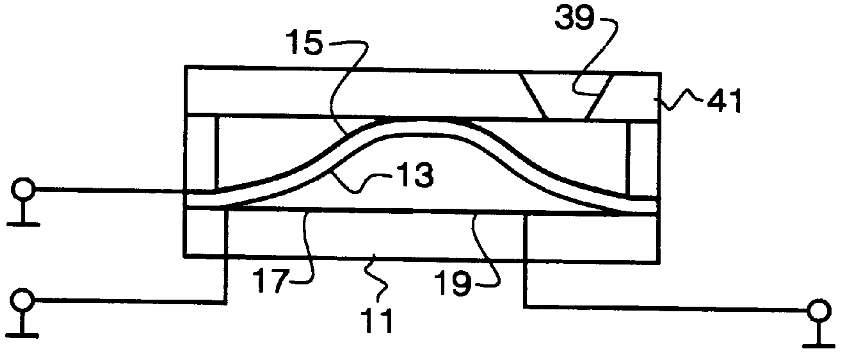
Figure 7B:
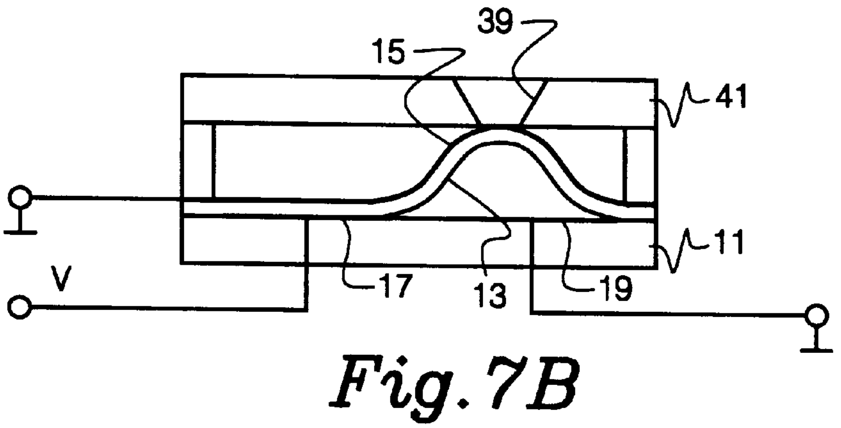

In FIGS. 7A and 7B, a second stationary support 41 helps define the valve chamber with first stationary support 11, and second support 41 includes a valve opening 39 to function in a normally open, electrostatically driven microvalve, similar to FIGS. 6A and 6B, but with closure of the valve opening 39 caused by activation of attraction between first electrode 15 and second electrode 17, wherein the buckled moveable support 13 engages and closes valve opening 39. In this case closure of the valve opening is caused by the buckled support moving into engagement as the other portion of the electrode is electrostatically actuated.

Figure 8A:
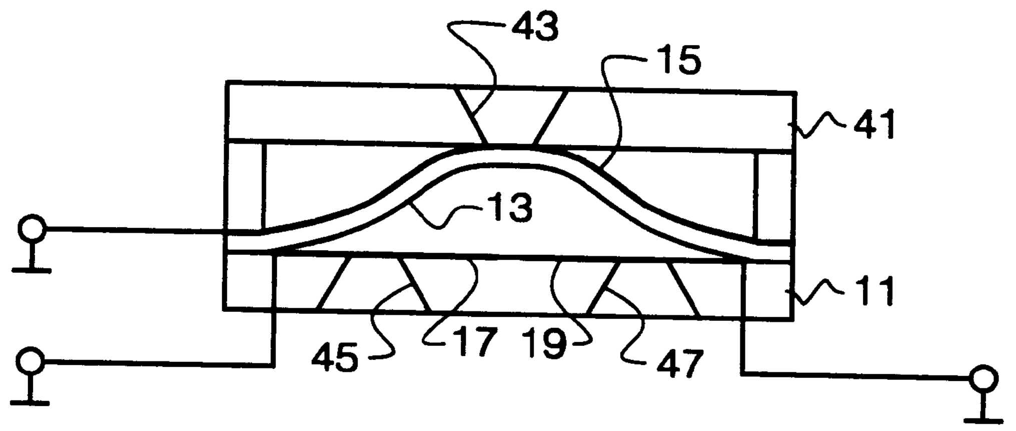
FIGS. 8A, 8B, 8C, 9A, 9B and 9C are schematic views illustrating two alternative forms of three-way microvalves.
Figure 8B:
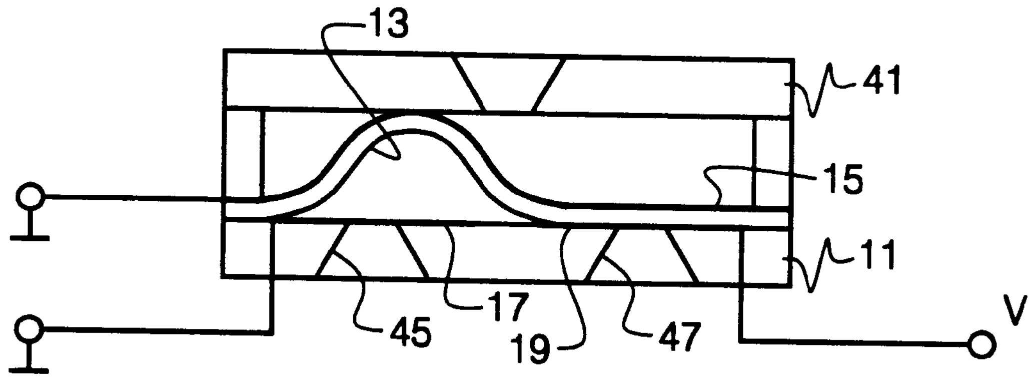
Figure 8C:
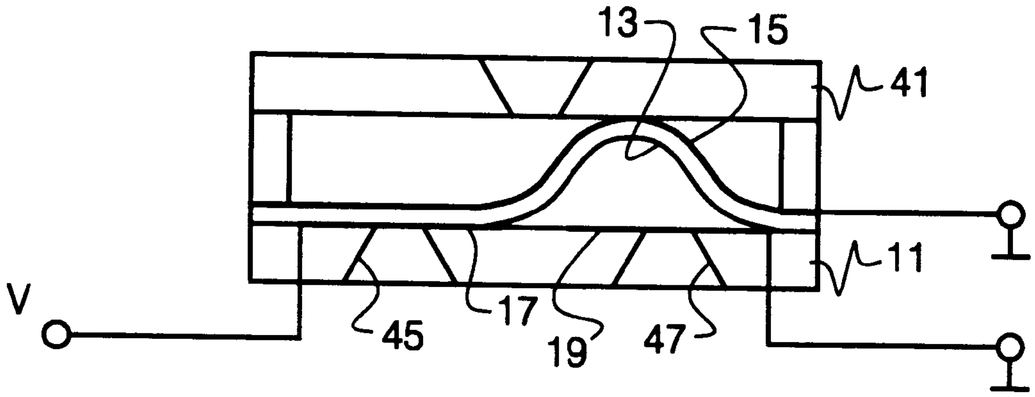

Yet another embodiment of the present invention is shown in FIGS. 8A, 8B, 8C, 9A, 9B and 9C, as follows. In FIGS. 8A, 8B, and 8C, the three way microvalve is shown with valve openings in first stationary support 11 and in second stationary support 41, again defining a valve chamber. As can be seen in FIGS. 8A, 8B, and 8C, valve openings 43, 45 and 47 are, at various times in the multiphase driving cycle, open or closed as buckled moveable support engages on or another electrode and provides restoring forces to separate other pairs of electrodes, as previously described herein. Valve opening 43 is normally closed, and valve openings 45 and 47 normally open. Valve opening 43 opens and valve openings 45 and 47 open and close respectively during operation of the electrostatic driving forces.

Figure 9A:
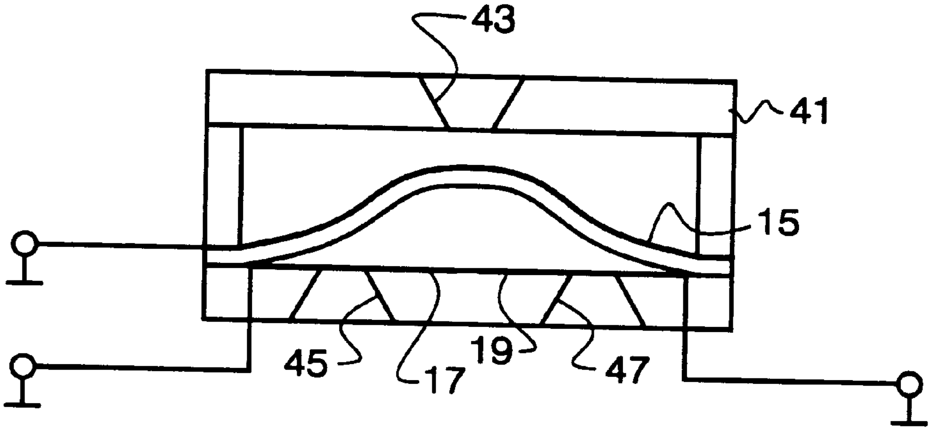
Figure 9B:
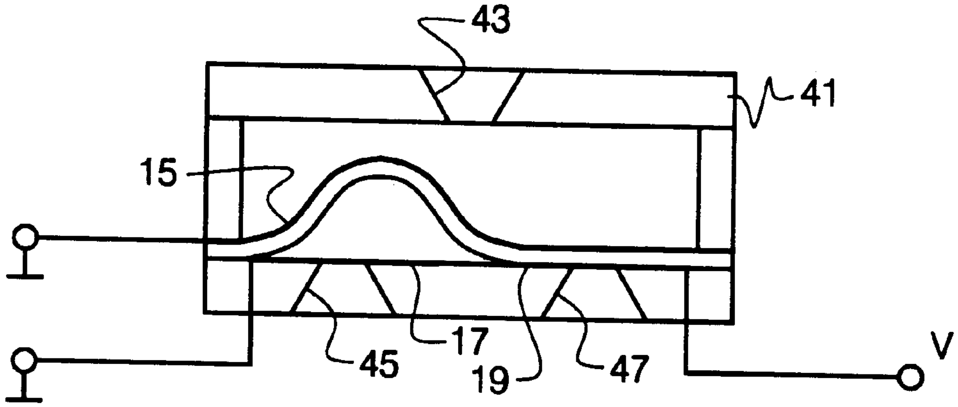
Figure 9C:
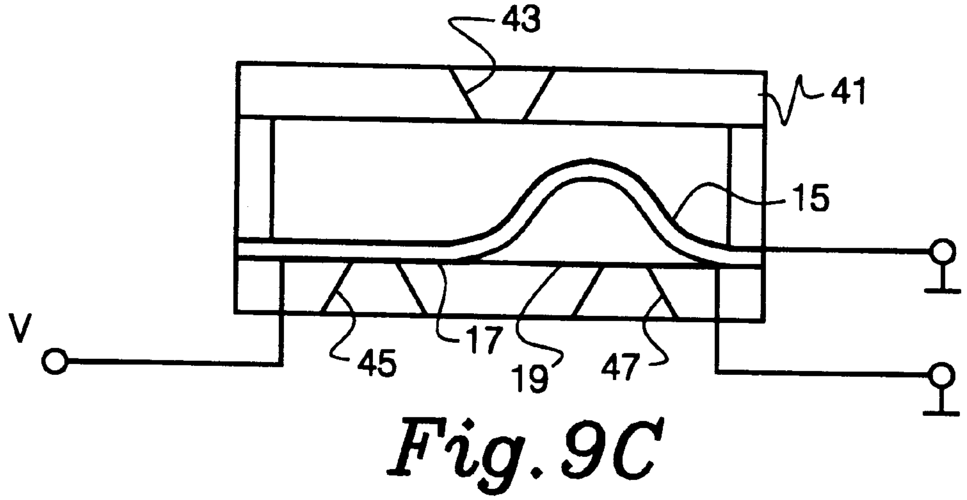

FIGS. 9A, 9B and 9C illustrate an alternative version of a three way valve, in which the valve opening 43 in the top substrate 41 has a normally open condition, rather than the normally closed version of FIG. 8A. Again, valve openings 45 and 47 open and close in sequence.

Figure 10A:
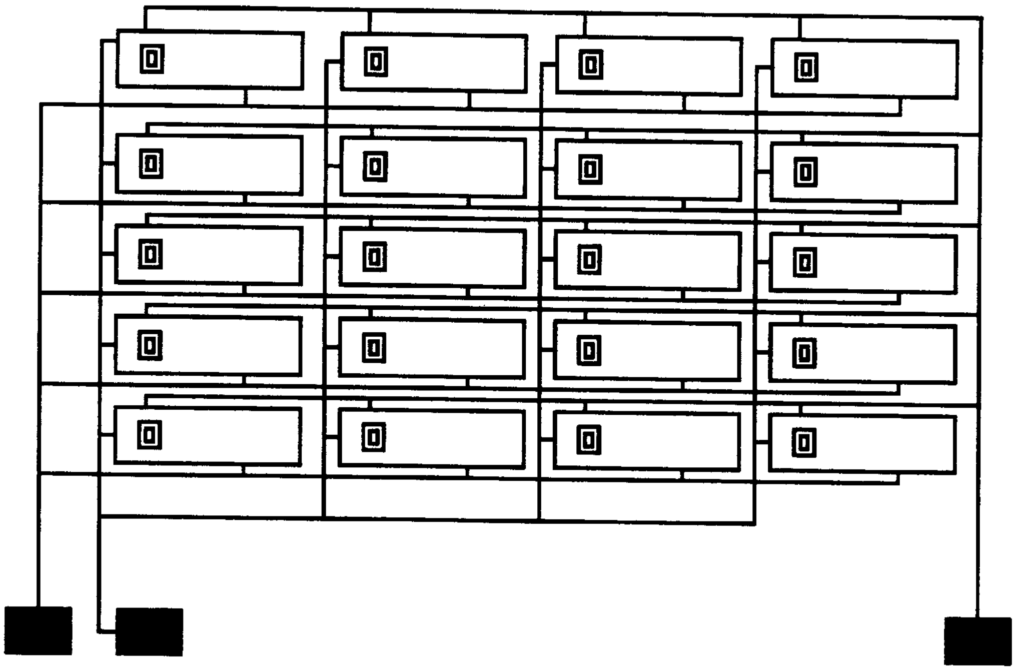
FIGS. 10A and 10B are schematic views of arrays of actuators according to the present invention, in which the arrays in FIG. 10A are addressed globally and the arrays in FIG. 10B are addressed individually.
Figure 10B:
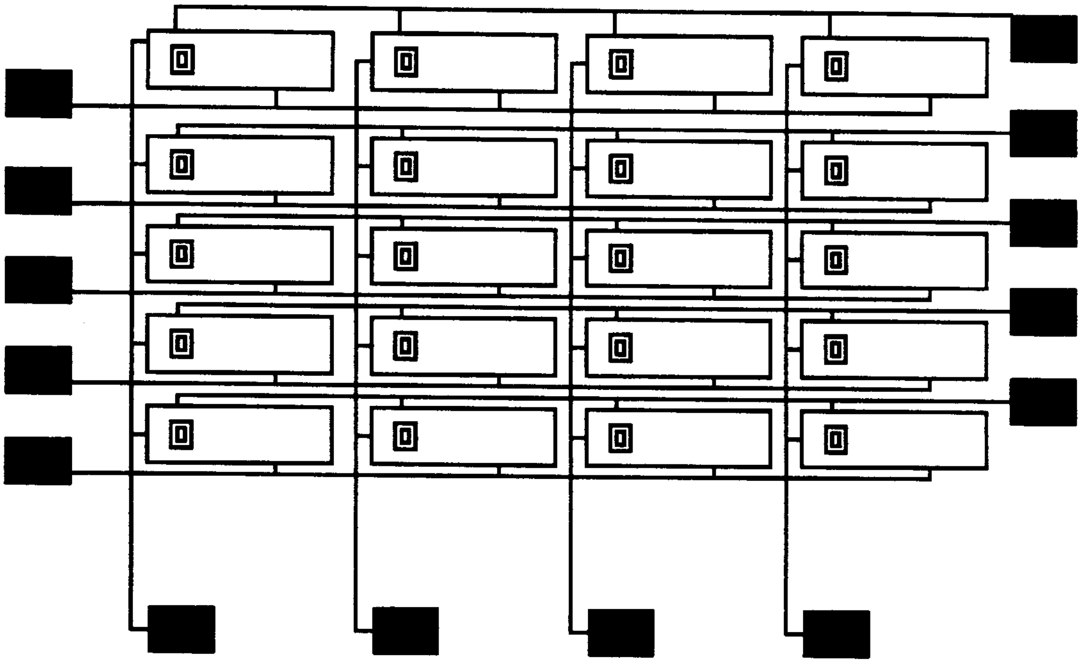

FIGS. 10A and 10B illustrate two embodiments in which a plurality of the various above described actuators are connected in parallel in order to meet a wider range of pressures and flow regimes. Specifically, FIG. 10A illustrates an array in which all of the actuators are addressed at the same time so that the valves work synchronously, so that each actuator contributes to the total output of the array. In FIG. 10B, each valve can be addressed and actuated individually, allowing the control of pressure and flow over a markedly extended range of values.

All of the embodiments shown herein take advantage of the out-of-place, buckled state of a doubly supported moveable support as it moves into and out of engagement with electrodes on the stationary support. A rolling type, electrostatic actuation will push the extra length of the structure of the bubble toward the non-actuated areas, providing a restoring force against stiction forces. For increased mechanical strength and to protect against overpressure, all the structures can have a top cap—like second support 41, for example—acting as a stopper.

While particular embodiments of the present invention have been illustrated and described, it is not intended to limit the invention, except as defined by the following claims.

We claim:

1. An electrostatic actuator device, comprising:

a stationary support and a buckled, moveable support having two ends mounted on said stationary support and positioned to enter into contact with a portion of said stationary support, said buckled, moveable support being compressed by having a length greater than the distance between its mounting supports to provide said buckle, said supports being non conductive;

at least first, second and third separated electrodes, said first electrode being mounted on said buckled moveable support and said second electrode being mounted on said stationary support, said third electrode being mounted selectively on one of said supports, said electrodes being positioned to form first and second pairs of opposing electrodes for electrostatic attraction between each opposing electrode;

insulating means for preventing electrically conductive contact between said electrodes; and a voltage supply means for supplying a voltage to provide electrostatic attraction selectively between said pairs of opposing electrodes and move a pair of electrodes into electrostatic contact;

said buckled electrode having a shape configured to transmit restoring force to the portion thereof in contact with stationary support upon application of voltage to the other pair of electrodes.

2. The device of claim 1, wherein said voltage supply means provides a two phase driving force including a first voltage to said first pair of electrode for a first period of time in a cycle of operation and a second voltage to said second pair of electrodes for a second period of time in said same cycle.

3. The device of claim 1, wherein said voltage supply means provides an interim period of time with no voltage to either pair of electrodes after each application of voltage to each pair of electrodes.

4. The device of claim 1, wherein said first and third electrodes are mounted on said buckled support and said second electrode is mounted on said stationary support, said second electrode being sized and positioned to form a pair of electrodes with each of said first and third electrodes on said buckled support, whereby electrostatic attraction between one of said pair of electrodes causes a restoring movement of said buckled support to separate the other of said pair of electrodes.

5. The device of claim 1, wherein said first electrode is mounted on said buckled support and said second and third electrodes are mounted on said stationary support, said first electrode being sized and positioned to form a pair of electrodes with each of said second and third electrodes on said stationary support, whereby electrostatic attraction between one of said pair of electrodes causes a restoring movement of said buckled support to separate the other of said pair of electrodes.

6. The device of claim 1, which further includes at least a fourth electrode mounted on one of said supports, said voltage supply means being adapted to supply a voltage to provide electrostatic attraction selectively between separate pairs of opposing electrodes to move only one pair of electrodes into electrostatic contact at any time.

7. The device of claim 6, wherein said first and third electrodes are mounted on said buckled support and said second and fourth electrodes are mounted on said stationary support, said electrodes being sized and positioned to form a pair of electrodes with said first and second electrodes and said third and fourth electrodes, whereby electrostatic attraction between one of said pair of electrodes causes a restoring movement of said buckled support to separate the other of said pair of electrodes.

8. The device of claim 6, wherein said first electrode is mounted on said buckled support and said second, third and fourth electrodes are mounted on said stationary support, said first electrode being sized and positioned to form separate pairs of electrodes with said second, third and fourth electrodes, whereby electrostatic attraction between one of said pair of electrodes causes a restoring movement of said buckled support to separate the other of said pairs of electrodes.

9. The device of claim 6, wherein said first, third, and fourth electrodes are mounted on said buckled support and said second electrode is mounted on said stationary support, said second electrode being sized and positioned to form separate pairs of electrodes with said first, third and fourth electrodes, whereby electrostatic attraction between one of said pair of electrodes causes a restoring movement of said buckled support to separate the other of said pairs of electrodes.

10. The device of claim 1, wherein said actuator forms a microvalve and said electrodes are positioned to provide a normally open valve.

11. The device of claim 1, wherein said actuator forms a microvalve and said electrodes are positioned to provide a normally closed valve.

12. The device of claim 1, wherein said actuator forms a microvalve having at least three valve openings and said electrodes are positioned provide an open condition selectively for said three valve openings.

13. An electrostatically driven microvarve, comprising:

a chamber defining at least one valve opening;

a stationary support positioned in said chamber;

a buckled, moveable support having two ends mounted on said stationary support and positioned to enter into contact with a portion of said stationary support, said buckled, moveable support being compressed by having a length greater than the distance between its mounting supports to provide said buckle, said supports being non conductive and said buckled moveable support being positioned for selective opening and closing said at least one valve opening upon movement of said buckled support;

at least first, second and third separated electrodes, said first electrode being mounted on said buckled moveable support and said second electrode being mounted on said stationary support, said third electrode being mounted selectively on one of said supports, said electrodes being positioned to form first and second pairs of opposing electrodes for electrostatic attraction between each opposing electrode;

insulating means for preventing electrically conductive contact between said electrodes; and a voltage supply means for supplying a voltage to provide electrostatic attraction selectively between said pairs of opposing electrodes and move said buckled support to bring a pair of electrodes into electrostatic contact;

said buckled electrode having a shape configured to transmit restoring force to the portion thereof in contact with stationary support upon application of voltage to the other pair of electrodes.

14. The device of claim 13, wherein said voltage supply means provides a two phase driving force including a first voltage to said first pair of electrode for a first period of time in a cycle of operation and a second voltage to said second pair of electrodes for a second period of time in said same cycle.

15. The device of claim 13, wherein said voltage supply means provides an interim period of time with no voltage to either pair of electrodes after each application of voltage to each pair of electrodes.

16. The device of claim 13, wherein said first and third electrodes are mounted on said buckled support and said second electrode is mounted on said stationary support, said second electrode being sized and positioned to form a pair of electrodes with each of said first and third electrodes on said buckled support, whereby electrostatic attraction between one of said pair of electrodes causes a restoring movement of said buckled support to separate the other of said pair of electrodes.

17. The device of claim 13, wherein said first electrode is mounted on said buckled support and said second and third electrodes are mounted on said stationary support, said first electrode being sized and positioned to form a pair of electrodes with each of said second and third electrodes on said stationary support, whereby electrostatic attraction between one of said pair of electrodes causes a restoring movement of said buckled support to separate the other of said pair of electrodes.

18. The device of claim 13, which further includes at least a fourth electrode mounted on one of said supports, said voltage supply means being adapted to supply a voltage to provide electrostatic attraction selectively between separate pairs of opposing electrodes to move only one pair of electrodes into electrostatic contact at any time.

19. The device of claim 18, wherein said first and third electrodes are mounted on said buckled support and said second and fourth electrodes are mounted on said stationary support, said electrodes being sized and positioned to form a pair of electrodes with said first and second electrodes and said third and fourth electrodes, whereby electrostatic attraction between one of said pair of electrodes causes a restoring movement of said buckled support to separate the other of said pair of electrodes.

20. The device of claim 18, wherein said first electrode is mounted on said buckled support and said second, third and fourth electrodes are mounted on said stationary support, said first electrode being sized and positioned to form separate pairs of electrodes with said second, third and fourth electrodes, whereby electrostatic attraction between one of said pair of electrodes causes a restoring movement of said buckled support to separate the other of said pairs of electrodes.

21. The device of claim 18, wherein said first, third, and fourth electrodes are mounted on said buckled support and said second electrode is mounted on said stationary support, said second electrode being sized and positioned to form separate pairs of electrodes with said first, third and fourth electrodes, whereby electrostatic attraction between one of said pair of electrodes causes a restoring movement of said buckled support to separate the other of said pairs of electrodes.

22. The device of claim 13, wherein said electrodes are positioned to provide a normally open valve.

23. The device of claim 13, wherein said electrodes are positioned to provide a normally closed valve.

24. The device of claim 13, wherein said chamber has at least three valve openings and said buckled moveable support is positioned to selectively operate as a three way microvalve.

25. A method of making an electrostatic actuator device, comprising the steps of:

providing a stationary support and mounting a buckled, moveable support having two ends on said stationary support and positioning said moveable support to enter into contact with a portion of said stationary support, said buckled, moveable support being compressed by having a length greater than the distance between its mounting supports to provide said buckle, said supports being non conductive;

mounting at least first, second and third separated electrodes on said supports, said first electrode being mounted on said buckled moveable support and said second electrode being mounted on said stationary support, said third electrode being mounted selectively on one of said supports, said electrodes being positioned to form first and second pairs of opposing electrodes for electrostatic attraction between each opposing electrode;

insulating said electrodes to prevent electrically conductive contact between said electrodes; and electrically connecting a voltage supply means to said electrodes for supplying a voltage to provide electrostatic attraction selectively between said pairs of opposing electrodes and move said buckled support to bring a pair of electrodes into electrostatic contact; said buckled electrode having a shape configured to transmit restoring force to the portion thereof in contact with stationary support upon application of voltage to the other pair of electrodes.

26. The method of claim 25, wherein said voltage supply means is adapted to provide a two phase driving force including a first voltage to said first pair of electrode for a first period of time in a cycle of operation and a second voltage to said second pair of electrodes for a second period of time in said same cycle.

27. The method of claim 25, wherein said voltage supply means is adapted to provide an interim period of time with no voltage to either pair of electrodes after each application of voltage to each pair of electrodes.

28. The method of claim 25, which includes the steps of mounting said first and third electrodes on said buckled support and mounting said second electrode on said stationary support, said second electrode being sized and positioned to form a pair of electrodes with each of said first and third electrodes on said buckled support, whereby electrostatic attraction between one of said pair of electrodes causes a restoring movement of said buckled support to separate the other of said pair of electrodes.

29. The method of claim 25, wherein which includes the steps of mounting said first electrode on said buckled support and mounting said second and third electrodes on said stationary support, said first electrode being sized and positioned to form a pair of electrodes with each of said second and third electrodes on said stationary support, whereby electrostatic attraction between one of said pair of electrodes causes a restoring movement of said buckled support to separate the other of said pair of electrodes.

30. The method of claim 25, which further includes the step of mounting at least a fourth electrode on one of said supports, said voltage supply means being adapted to supply a voltage to provide electrostatic attraction selectively between separate pairs of opposing electrodes to move only one pair of electrodes into electrostatic contact at any time.

31. The method of claim 30, which includes the step of mounting said first and third electrodes on said buckled support and mounting said second and fourth electrodes on said stationary support, said electrodes being sized and positioned to form a pair of electrodes with said first and second electrodes and said third and fourth electrodes, whereby electrostatic attraction between one of said pair of electrodes causes a restoring movement of said buckled support to separate the other of said pair of electrodes.

32. The method of claim 30, which includes the step of mounting said first electrode on said buckled support and mounting said second, third and fourth electrodes on said stationary support, said first electrode being sized and positioned to form separate pairs of electrodes with said second, third and fourth electrodes, whereby electrostatic attraction between one of said pair of electrodes causes a restoring movement of said buckled support to separate the other of said pairs of electrodes.

33. The method of claim 30, which includes the step of mounting said first third and fourth electrodes on said buckled support and mounting said second electrode on said stationary support, said second electrode being sized and positioned to form separate pairs of electrodes with said first, third and fourth electrodes, whereby electrostatic attraction between one of said pair of electrodes causes a restoring movement of said buckled support to separate the other of said pairs of electrodes.

34. A method of making a microvalve, comprising the steps of:

forming a microvalve chamber defining at least one valve opening; and positioning the device of claim 1 therein.

35. The method of claim 34, which includes the steps of providing said chamber with at least three valve openings and positioning said buckled moveable support to selectively cooperate with said three valve openings to function as a three way microvalve.

36. The method of claim 34, which includes the steps of providing a plurality of said electrostatic devices, each device being configured with first, second and third valve openings; and connecting array flow means to said plurality of electrostatic devices in parallel, including a first input source for supplying a common input to said first valve opening in each of said devices, a second input source for supplying a common input to said second valve opening in each of said devices, and a first output for receiving a common output from said third valve opening in each of said devices.

37. The method of claim 34, which includes the steps of providing a plurality of said electrostatic devices, each device being configured with first, second and third valve openings; and connecting array flow means to said plurality of electrostatic devices in parallel, including a first input source for supplying a separate input to said first valve opening in each of said devices, a second input source for supplying a separate input to said second valve opening in each of said devices, and a first output for receiving a separate output from said third valve opening in each of said devices.

38. An array of electrostatic devices, comprising a plurality of electrostatic devices of claim 24, each being configured with first, second and third valve openings; and array flow means connecting said plurality of electrostatic devices in parallel, including a first input source for supplying a common input to said first valve opening in each of said devices, a second input source for supplying a common input to said second valve opening in each of said devices, and a first output for receiving a common output from said third valve opening in each of said devices.

39. An array of electrostatic devices, comprising a plurality of electrostatic devices of claim 24, each being configured with first, second and third valve openings; and array flow means connecting said plurality of electrostatic devices in parallel, including a first input source for supplying a separate input to said first valve opening in each of said devices, a second input source for supplying a separate input to said second valve opening in each of said devices, and a first output for receiving a separate output from said third valve opening in each of said devices.

* * * * *